United States Patent [19]

Harper et al.

[11] Patent Number: 4,476,069
[45] Date of Patent: Oct. 9, 1984

[54] LIQUID DISTRIBUTING APPARATUS FOR A LIQUID-VAPOR CONTACT COLUMN

[75] Inventors: Stephen M. Harper, Lake Jackson; Jeffrey H. Stultz, Freeport, both of Tex.

[73] Assignee: The Dow Chemical Company, Midland, Mich.

[21] Appl. No.: 566,613

[22] Filed: Dec. 29, 1983

Related U.S. Application Data

[63] Continuation-in-part of Ser. No. 469,077, Feb. 23, 1983, Pat. No. 4,432,913, which is a continuation-in-part of Ser. No. 298,058, Aug. 31, 1981, abandoned.

[51] Int. Cl.³ .............................................. B01F 3/04
[52] U.S. Cl. ...................................... 261/97; 239/193
[58] Field of Search ..................... 261/97, DIG. 44; 239/193

[56] References Cited

U.S. PATENT DOCUMENTS

| | | | |
|---|---|---|---|
| 632,795 | 9/1899 | Stoddard | 261/DIG. 11 |
| 1,673,732 | 6/1928 | Brooks | 261/114 R |
| 2,590,779 | 3/1952 | Lehmann | 261/97 |
| 3,006,623 | 10/1961 | Ross et al. | 261/97 |
| 3,290,025 | 12/1966 | Engalitcheff, Jr. | 261/97 |
| 3,360,246 | 12/1967 | Eckert . | |
| 3,392,967 | 7/1968 | Eckert . | |
| 3,446,489 | 5/1969 | Leva . | |
| 3,723,072 | 3/1973 | Carson et al. | 261/97 |
| 3,937,769 | 2/1976 | Strigle, Jr. et al. | 261/97 |
| 4,126,540 | 11/1978 | Grosboll et al. | 261/97 |
| 4,264,538 | 4/1981 | Moore et al. | 261/97 |
| 4,267,978 | 5/1981 | Manteufel | 239/193 |

FOREIGN PATENT DOCUMENTS 1364649 8/1974 United Kingdom .
573176 10/1977 U.S.S.R. .

OTHER PUBLICATIONS

Norton, "Packed Tower Materials", Apr. 1974, Catalog of Norton Co. of Akron, Ohio.
Chemical Engrs. Handbook, Chilton, McGraw-Hill Book Co., Apr. 1973, pp. 5-10, 5-11, 5-16, 5-17.

*Primary Examiner*—Tim R. Miles
*Attorney, Agent, or Firm*—M. W. Barrow

[57] ABSTRACT

Improved trough-type liquid distributors and redistributors for use in vapor-liquid contact columns wherein uniform distribution of downflowing liquid is achieved by employing orifices in the sides of troughs, said orifices being sized such that they stay submerged. Better distribution is obtained when the orifices are used with adjacent vertical drip rods to which the liquid can adhere and follow downwardly by gravity flow. The invention allows good distribution at very low flow rates, e.g. less than 0.8 gallons/minute/square foot.

2 Claims, 6 Drawing Figures

LIQUID DISTRIBUTING APPARATUS FOR A LIQUID-VAPOR CONTACT COLUMN

CROSS REFERENCE TO RELATED APPLICATION

This application is a continuation-in-part of application Ser. No. 469,077, filed Feb. 23, 1983, now U.S. Pat. No. 4,432,913, which is a continuation-in-part of application Ser. No. 298,058, filed Aug. 31, 1981, now abandoned.

BACKGROUND OF THE INVENTION

1. Field of The Invention

This invention relates to a method and apparatus for uniformly distributing a downflowing liquid in a liquid-vapor contact tower. The invention is not limited to the instance where the vapor flows upwardly in the tower, i.e. countercurrent to the liquid; but rather the invention also includes those instances wherein the vapor flows downwardly, i.e. co-currently with the liquid in the tower. However, for clarity's sake the invention will be described as though the vapor is always rising to better contrast the vapor from the liquid which is always falling.

2. Definition Used Herein

Trough-type Distributor

A trough-type distributor is one which employs a plurality of spaced troughs, having closed ends and which are usually parallel. Liquid is usually fed to these troughs from one or more so-called "parting boxes" or "splitters" located above the troughs. Usually located in the sides of such troughs are triangular or rectangular weirs. The bottoms of these weirs are usually located at the same horizontal height when the distributor is installed in a tower. Gas rising in the tower is allowed to pass between the spaced troughs while liquid falls from the weirs. A representative example of such weir-type distributors can be found in U.S. Pat. No. 3,937,769 which is incorporated herein by reference as if set forth at full length. In some instances the troughs have orifices cut in their bottoms. See British Pat. No. 1,364,649.

3. Discussion of Prior Art

Liquid distributing apparatus are used for various purposes in variously named vapor-liquid contact towers. Examples of such towers are fractionating columns, rectifiers, strippers, absorbers, and the like. These towers are usually equipped with means for uniformly distributing a liquid to a region of extended surface contact. The region of extended surface contact is usually a region in the tower which is packed with the materials commonly used as packing for fractionating columns; e.g. Raschig rings, Lessing rings, Pall rings, cross-partition rings, single-, double- and triple spiral rings, Berl saddles, Intalox saddles, continuous wire, sponge wire, and the like.

The reason for using distribution means in the above circumstances is to assure that uniform wetting of the packing by the draining liquid is achieved. This is done so as to achieve uniform contacting conditions between the descending liquid and ascending vapor. This type of contact enhances transfer of mass and heat between the liquid and vapor phases. Failure to wet the packing evenly results in unequal liquid mass flow density throughout its volume. Variations can range from completely dry areas to flooded areas, both conditions being detrimental to column functionality and, in cases of temperature-sensitive liquids, material decomposition. Solids formation and plugging can also occur in the low mass flow density "dry-spot" sectors.

Various types of apparatus for distributing liquids in materials exchange columns already exist and are well known in the art. An example of such are the trough-type distributors defined above. The principal function of these distributors is to uniformly distribute liquid draining through them onto a bed of column packing located below them while allowing the flow of vapors upwardly through them in a sufficiently free manner so as not to incur any significant pressure drop in this vapor. This liquid distribution is done for the purpose of having uniform, intimate, and efficient mixing of the liquid and vapors in the column packing.

These distributors are usually satisfactory for obtaining uniform distribution of liquid in the column packing, for large flow rates, e.g. flow rates greater than 2 gallons/minute/sq. foot. However, for low flow rates the known distributors have not been satisfactory. Particularly is this true in towers where the liquid to be distributed has a very small flow rate; e.g. from about 0.15 to about 0.8 gallons/minutes per square foot of horizontal cross-section of the tower as measured at the horizontal cross-section of the tower where the liquid distribution occurs.

A liquid maldistribution problem common to these trough-type liquid distributors is the tendency of the liquid passing through them to wet the surface of the outlet of the distributor, adhere to this surface in a smearing fashion, and follow that surface to some unpredictable point where it drips off in some significantly maldistributed manner. This effect becomes more pronounced the further from perfectly horizontal from which the bottoms of these distributors deviate. Virtually all liquid distributors are less than perfectly horizontal when installed, and tend to become further so as the tower shifts further from the true vertical due to foundation shifting and the like.

Trough-type distributors usually have triangular or rectangular weirs in their sides. The weirs produce a further disadvantage in producing a uniform liquid distribution. This disadvantage is that such uniform liquid distribution is greatly reduced by variations in liquid head pressure from weir to weir. These pressure variations can be either flow induced, or, it can be produced by misfabrication or poor installation, or the like.

It is a common practice to design distributors so that, when liquid is flowed through weirs in the sides of troughs in trough-type distributors the level of the liquid is maintained at a level below the tops of the weirs. The problem with such designs, however, is that they cannot produce acceptably uniform flow distribution at low flow rates (less than 2.0 gal./min./sq. ft.). This problem arises from being unable to maintain the bottom of the weirs at exactly the same horizontal height. Such deviation produces different head pressures above the bottom of the weirs. Of course, different head pressures will give different liquid flow rates out of the same weir; and when many of the same type weirs are used, as they are in these liquid distributors, and when the individual weirs have different head pressures, then there occurs different flow rates from the different weirs. And, of course, different flow rates mean different liquid distribution, i.e. undesirable non-uniform liquid distribution.

One feature about triangular or rectangular weirs which those skilled in the art have apparently failed to appreciate is the difference in changes in flow rates out of unsubmerged different shaped weirs when subjected to different head pressures. The flow rate out of an unsubmerged triangular weir is propotional to the head pressure raised mathematically to about the 2½ power. Thus a slight head pressure variation in such a distributor will cause a proportionally small head pressure difference above the many triangular weirs spread across the distributor; but it will greatly multiply the difference in flow coming from the different weirs, and thus will greatly multiply the liquid flow maldistribution. Rectangular unsubmerged weirs are not as sensitive to different head pressures caused by slight head variations as are unsubmerged triangular weirs, but deviations still produce a disproportional flow variation from design flow rate. Through rectangular unsubmerged weirs the flow rate is proportional to the head pressure raised to about the 1.5 power.

On the other hand, flow through submerged openings of any shape is proportional to only about the square root (½ power) of the pressure head. Thus using submerged openings with variable head pressures greatly reduces flow rate differences when compared to the differences produced by triangular and rectangular weirs when they are not submerged.

The present invention takes advantage of the use of submerged openings or orifices as well as greatly diminishing liquid maldistribution by other means including "drip rods" which are described herein below.

STATEMENT OF THE INVENTION

This invention is a trough-type liquid distributor capable of being used in a liquid-vapor materials exchange tower to improve the distribution of liquid flowing downwardly through vapor in such a tower so that more intimate mixing is obtained between the vapor and liquid. Usually in such towers a bed of column packing is employed below the distributor. Uniform liquid distribution herein means distributing liquid at at least one distribution point per 20 in.$^2$ of tower cross-sectional area. Higher irrigation rates have been successfully demonstrated, and at lower rates than even 0.15 gal.-/min./ft.$^2$, there is no reason to believe that this apparatus will not operate satisfactorily.

This invention resides in improvements for trough-type distributors for use in liquid-vapor contact towers wherein it is desired to uniformly distribute a liquid phase flowing downwardly from troughs spaced across the tower while allowing vapor to rise between the troughs. This distributor contains a plurality of spaced, parallel troughs, each of which has orifices or enclosed openings through its sides with said orifices being located below the top and above the bottom of said sides. These orifices are substantially uniformly spaced from one another and are located such that when the distributor is fitted in a tower for operation they are substantially all at the same horizontal level. These orifices are each of the same size in cross-sectional area, and are sufficiently small in said area so as to be capable of maintaining liquid flowing into the troughs under design flow rates at a level in the troughs above the tops of the orifices to insure that the liquid flowing through each orifice has a slight head pressure upon it so that the liquid flow rate of the liquid streamlets flowing through said orifice is substantially uniform from orifice to orifice.

Preferably the trough-type distributor described above further comprises a plurality of substantially vertical drip rods attached to the outside of the trough in such a fashion that substantially all of the orifices have at least one vertical rod attached adjacent to each one of them and such that substantially all of these drip rods extend below the bottom of the trough so as to form a surface along which liquid emerging through the orifices from the inside of the trough can adhere and flow downwardly to their bottom ends and from whence rod ends the liquid can fall in the same distribution pattern as are the pattern of the rods' bottom ends with respect to each other when placed in a liquid-vapor contact tower.

It is also preferably for the trough-type distributor described above be one wherein substantially all of said orifices each has a parallel pair of vertical drips rods associated with it, one rod of the pair being adjacent to the orifice on one of the orifice's sides while the other vertical rod of the pair is attached adjacent to the orifice on the orifice's opposite side. The space between the drip rod pairs serves as a channel in which the liquid can gravity flow downwardly. Even more uniform liquid distribution is assured when the sides of the troughs extend below the bottoms of the troughs and when the bottom tips of the drip rods extend below the lower edges of these extended sides.

Preferably each orifice has a pair of spaced drip rods associated with it and attached to the vapor side of the trough sides. (The vapor side is the side of the trough side which faces outwardly from its trough.) Preferably these drip rods extend below the trough side walls in such a manner so that each orifice has a pair of parallel, spaced, drip rods associated with it, and further in such a manner so that one rod of each pair is located adjacent to one side of its associated orifice and the other drip rod is located adjacent to the other side of that orifice.

Thus a substantially vertical drip rod pair forms a channel down which the liquid which comes out of the orifice can flow and can be guided vertically downward between the drip rods. The liquid flows downwardly in the channel between the drip rods to the bottom of the drip rods. From these the liquid falls downwardly in the same pattern as it emerged from the orifices. Inasmuch as the drip rods' bottoms are the lowest points on the distributor, the liquid follows them downwardly to their bottom tip instead of adhering to the bottom of the trough and onto unknown points and there falling from the distributor bottom in a maldistributed manner.

The distance between each pair of drip rods forming a channel is the same for each channel formed by pairs of drip rods. It is preferred that each drip rod of a pair forming a channel also be equidistant from its orifice to which it is adjacent. But being equidistant in that manner is not essential. The drip rod pair can also be offset from the orifice with one drip rod of the channel forming drip rod pair being closer to the opening than the other drip rod of that pair. But in this latter situation three things should be emphasized. First, the distance between the drip rods forming the channel pair for each orifice is the same for all orifices.

Secondly, the off-set is to the same side of each orifice for all orifices along the trough side to which they are attached. That is, if the left drip rod of a pair of drip rods is at a greater distance from its orifice than the right drip rod of one pair, then all left drip rods of drip rod pairs on that trough side are spaced the same distance from their orifices. Similarly, all right drip rods are spaced the same distance as each other from their respective orifice on that trough sides.

Thirdly, if off-set drip rod pairs are used on one trough side, then the drip rods of all orifices through the distributor through sides must be adjusted so that each pair of drip rods are substantially uniformly spaced across the tower in which they are installed.

This off-set drip rod spacing can better be understood by reference to the discussion of FIGS. 4, 5 and 6 set forth below.

Suffice it here to state that for purposes of the claims, the phrase, "equdistant channels" includes the situations described above where the separate rods of drip rod pairs are off-set from their respective orifices as well as when they are equidistant from their respective orifices.

Regarding the drip rods of each pair being equidistant from their respective orifices, there is one special situation which this invention covers which may not be readily apparent. This is the situation where the drip rods are spaced equidistantly between each orifice. In this situation one drip rod will serve as two insofar as forming pairs are concerned. That is, a drip rod to the left of one orifice will also serve as the drip rod to the right of the next adjacent orifice to the left of that drip rod.

Regarding the use of the word "adjacent" herein with respect to the relationship between drip rods and their orifices, two points should be made. First, a drip rod defined as being adjacent to an orifice means that the rod is near that orifice, but not necessarily tangent to that orifice. In fact, being tangent to an orifice, although theoritically is the most preferred position for a drip rod, it is usually too close to specify in specifications sent to a fabrication shop, for such a specification runs the risk of having the machinists assemble the unit with the drip rods slightly in front of the orifices. It has now been discovered that placing a drip rod in front of an orifice greatly disrupts the liquid flow rate from the orifice even if all orifices have drip rods similarly placed in front of them. Hence, to avoid this potentiality, it is most preferred to specify that the adjacent drip rod be located a distance from the orifice which equals about one-half the diameter of the orifice opening.

BRIEF DESCRIPTION OF THE DRAWINGS

The invention will be better understood by reference to the drawings wherein embodiments of the invention are illustrated, wherein like reference numerals refer to like parts in the various drawings, and wherein.

DETAILED DESCRIPTION OF THE PREFERRED EMBODIMENTS

Figure 1:
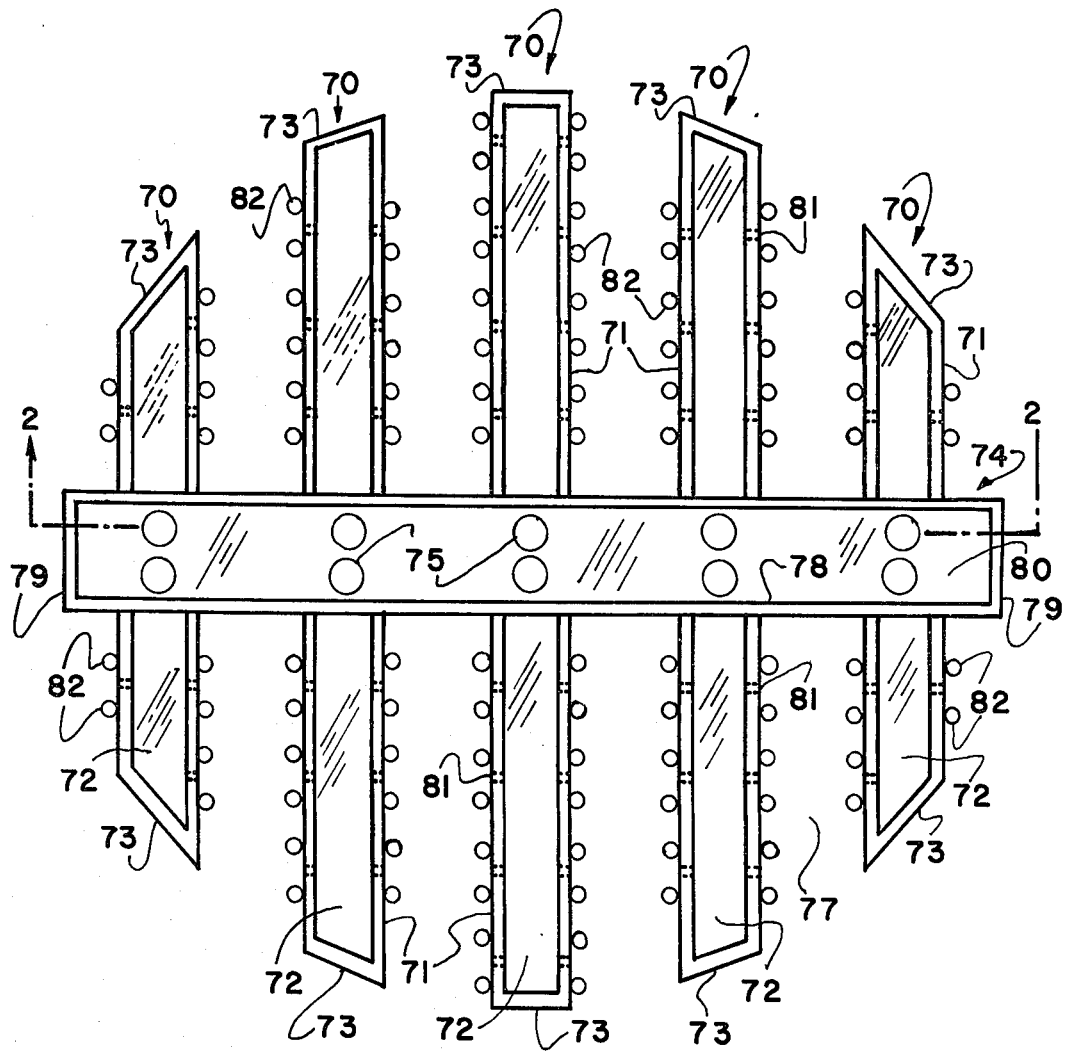
FIG. 1 is a top view of a trough-type distributor having the improved features of this invention.
Figure 2:
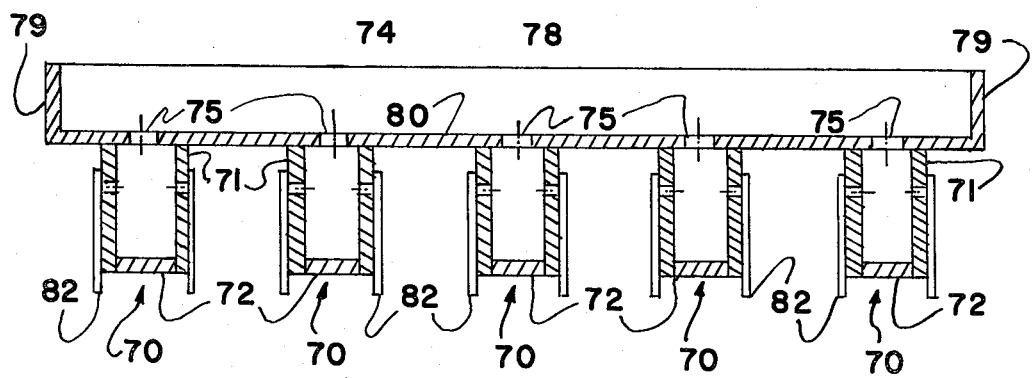
FIG. 2 is a sectional side view of the trough-type distributor of FIG. 1 take along lines 2—2 in FIG. 1.

The preferred embodiments of the trough-type distributor of this invention can be seen by reference to the drawings. Troughs 70 are generally box-like in shape. That is they have two vertical sides 71, a bottom 72, two closed ends 73, and an open top. Troughs 70 are horizontal, parallel to each other, and are spaced apart from each other. They are adapted to contain liquid. Troughs 70 have their ends 73 shaped in this embodiment for fitting into a cylindrical tower such as Liquid is fed to troughs 70 from splitter box 74 via pairs of sized holes 75 located in the bottom 80 of said splitter box 74. Holes 75 are located above their respective troughs so that liquid will flow into the trough and not into the spaces 77 between troughs 70. Spaces 77 are present to allow gas rising from beneath the distributor to pass through the distributor without incurring significant pressure drop. Holes 75 are sized so that an amount of liquid which is proportional to the size of each trough 70 will flow into the different length troughs 70.

Splitter box 74 has sides 78, ends 79, bottom 80, and is generally open at its top.

In the sides 71 of troughs 70 are located a plurality of round orifices 81. These round orifices 81 are of all the same horizontal elevation in all the troughs 70. They are all of the same area in opening, i.e. the same diameter. They are sized small enough such that for the liquid they are designed to allow to pass from the inside of trough 70 to its outside, the liquid level in trough 70 will be above the top of said round orifices 81; that is the round orifices 81 will be submerged with respect to the liquid level in troughs 70. Orifices 81 are also spaced from one another in a substantially uniform manner. Preferably orifices 81 are round in shape, but they can be of other geometrical designs, such as triangular and rectangular shaped, so long as they have the same size or area of opening through which the liquid is to flow, and so long as they are sized sufficiently small to maintain the liquid level above them.

Associated with each orifice 81 is a pair of vertical, parallel, drip rods 82. Drip rods 82 are attached to the outside of troughs 70; that is, on the vapor side of troughs 70 as described above for the plate-type distributor. A drip rod 82 is located on each side of each orifice 81. Thus when liquid emerges from the inside of trough 70 through an orifice 81, it contacts the pair of drip rods to which it can adhere and flow downwardly in the channel between the two parallel drip rods 82 associated with that round orifice 81. The drip rods 82 extend below the bottom of trough sides 71 so that there is even a better distribution pattern of the liquid. This better distribution is brought about because the liquid will adhere to the drip rods and follow them down to their bottom ends before they fall instead of adherring to the bottom 72 of trough 70 and running along it to some unknown site before dripping off. Liquid dripping from the predetermined sites of the bottoms of drip rods 82 provides much more capability of uniform flow distribution than from an unknown site on the bottom 72 of trough 70. The drip rods 82 can be connected at their bottoms if so desired, but they can not be attached to trough sides 71 in a fashion such that they are in front of orifices 81. When they are in front of orifice 81 they cause a maldistribution of liquid flow from the orifices 81 even if they are put in front of each orifice in a uniform manner.

Figure 3:
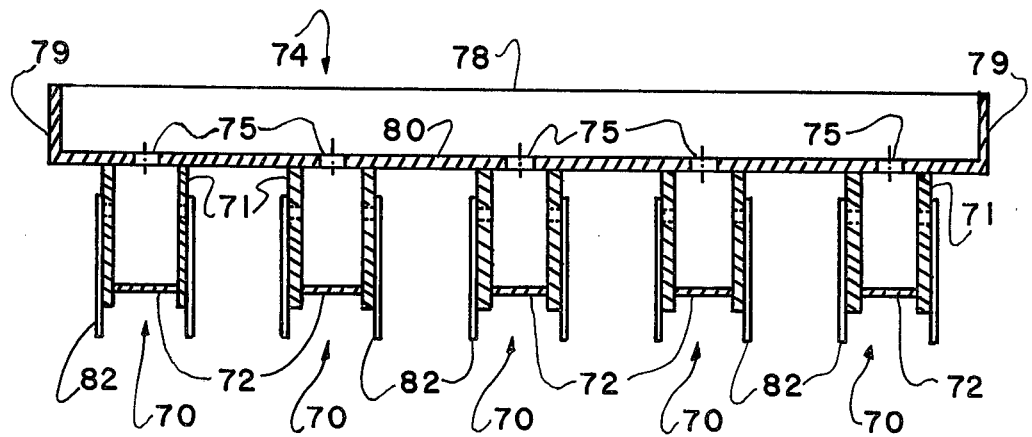
FIG. 3 is a more preferred embodiment of the invention than the one illustrated in FIG. 2; it too is taken along line 2—2 in FIG. 1.

A further enhancement of uniform liquid distribution is achieved by having the trough sides 71 extend below the trough bottoms 72 as shown in FIG. 3. This extension forms a lip which totally prevents any liquid from adhering to and flowing along the trough bottoms 72 in an undesireably uncontrolled way. It is still preferred for each pair of drip rods 82 associated with each opening or orifice 81 to extend downwardly below the bottom of each side 71 so as to better guide the liquid flowing downwardly between the pair into the area located directly beneath the bottom tip of the drip rod pair 82.

At this point it is convenient to illustrate some of the various relationships which can exist between the orifices 81 and their adjacent pairs of drip rods 82. This can best be done by reference to FIGS. 4, 5 and 6. Each orifice 81 has a pair of drip rods 82 associated with it, one of the drip rods 82 of the pair being adjacent to the orifice on one side and the other drip rod 82 of the pair being adjacent to the orifice on the opposite side. (Adjacent is not used herein as merely meaning abutting, although abutting (i.e., tangent to) is included in the meaning of adjacent. Adjacent means nearby, or close to, or the one closest in a given direction.)

Figure 4:
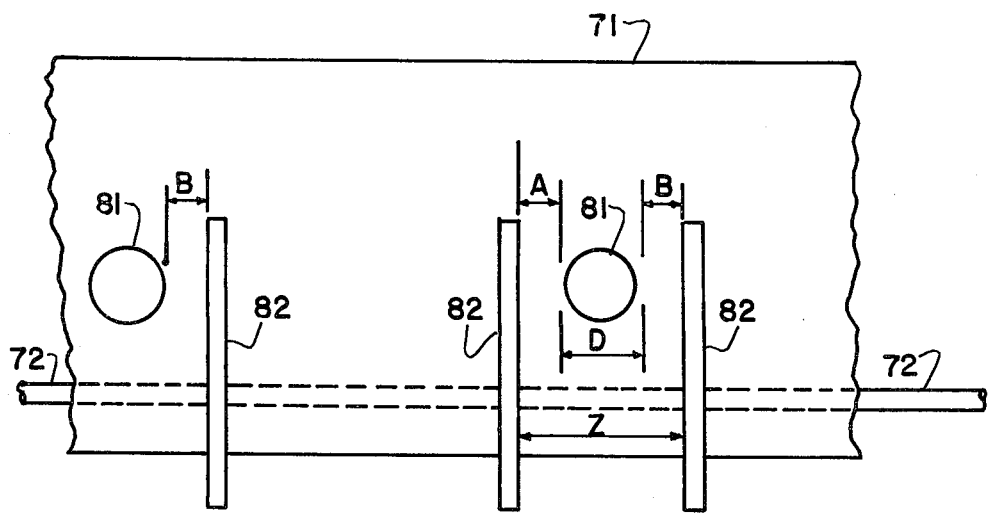
FIGS. 4, 5 and 6 are enlarged, fragmentary side views of different trough sides illustrating some of the possible different relationships which can exist between the orifices and the pair of drip rods associated with each orifice.

In FIG. 4, there is shown the preferred configuration of drip rod 82 to orifice 81. The left adjacent drip rod 82 is shown at a distance "A" from orifice 81 while the right adjacent drip rod 82 of the pair is shown at a distance "B" from the orifice 8. In FIG. 4, A=B and, moreover, A=B=one-half of the diameter, D, of the orifice 81. The distance betwen the drip rods 82 of any pair of drip rods 82 is given as "Z". In all embodiments the distance "Z" of all pairs of drip rods 82 is constant in that embodiment. This space between pairs of drip rods is defined as the "equidistant channel" for the orifice 81 associated with that pair of drip rods 82.

Figure 5:
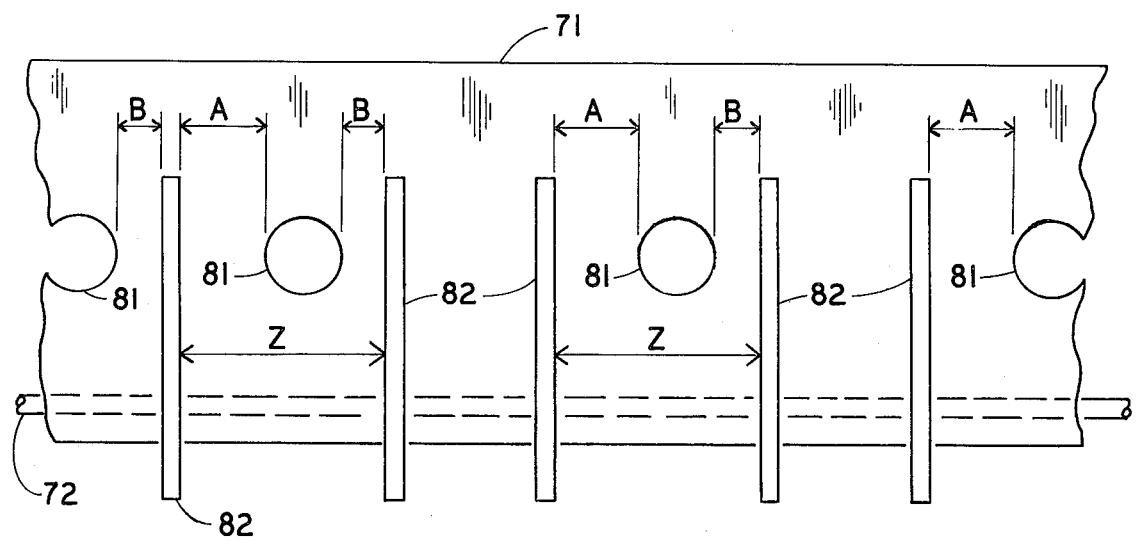

In FIG. 5, each pair of drip rods 82 associated with an orifice 81 is off-set from that orifice 81. That is, the distance "A" does not equal the distance "B". However, the distance "Z" is constant for each "equidistant channel". Also the distance "A" is constant for each orifice 81 as is the distance "B" for each orifice 81.

Figure 6:
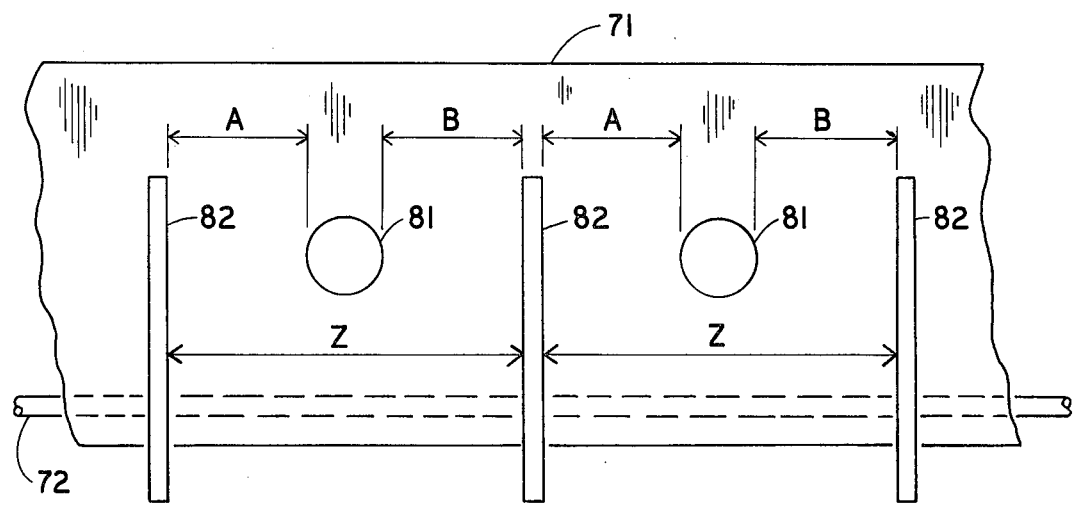

In FIG. 6, the same constancy of the distances "A", "B" and "Z" exist across the trough side 71. But the unique case is shown where the drip rods 82 are equidistant between orifices 81. In this case, one drip rod 81 not only serves as the right drip rod of a drip rod pair for one orifice, but it also serves as the left drip rod for the orifice located to the right of the first orifice.

Other specific configurations of drip rod pairs will come to mind which fit the criteria stated above in the statement of invention section for the relationships between the drip rod pairs and their associated openings. For example the drip rods of a pair need not be vertical.

We claim:

1. A trough-type liquid distributor apparatus for use in liquid-vapor contact towers wherein it is desired to uniformly distribute a liquid phase flowing downwardly from troughs spaced across the tower while allowing vapor to rise between the troughs, which distributor comprises:

a. a plurality of spaced, parallel troughs, each of which has orifices in its sides with said orifices being located below the top and above the bottom of said sides; which orifices are substantially uniformly spaced from one another; which orifices are located such that when the distributor is fitted in a tower for operation these orifices are substantially all at the same horizontal level; which orifices are each of the same size in cross-sectional area; which orifices are sufficiently small in said area so as to be capable of maintaining liquid flowing into the troughs under design flowrates at a level in the troughs above the tops of the orifices to insure that the liquid flowing through each opening has a slight head pressure head upon it so that the liquid flowrate of the liquid streamlets flowing through said orifice is substantially uniform from orifice to orifice;

b. a multiplicity of substantially parallel, substantially vertically oriented drip rods attached to the outside of the trough in such a fashion so that substantially all of the orifices have a pair of drip rods associated with them, one drip rod being adjacent an orifice on one side of the orifice and the other drip rod being adjacent that orifice on the opposite side of that orifice so as to form an "equidistant channel" between the two drip rods of the drip rod pair below the orifice; and c. said drip rods extending below the bottom of the troughs so that liquid emerging from the orifice between will gravity flow downwardly in the "equidistant channel", past the bottom of said troughs, and on downwardly and off the bottom ends of the drip rods into the tower section below the drip rods in the same distribution pattern as is the distribution pattern of the bottom ends of the drip rods.

2. The distributor of claim 1 which further comprises the sides of the trough extending below the bottom of the trough and the drip rods extending below and downwardly past the bottom edge of the sides.

* * * * *